United States Patent
Kumnick et al.

(10) Patent No.: US 9,846,878 B2
(45) Date of Patent: Dec. 19, 2017

(54) PAYMENT ACCOUNT IDENTIFIER SYSTEM

(71) Applicants: Phillip Kumnick, Phoenix, AZ (US); Joseph Bjorn Ovick, Foster City, CA (US); Chandra Srivastava, Foster City, CA (US)

(72) Inventors: Phillip Kumnick, Phoenix, AZ (US); Joseph Bjorn Ovick, Foster City, CA (US); Chandra Srivastava, Foster City, CA (US)

(73) Assignee: Visa International Service Association, San Francisco, CA (US)

(*) Notice: Subject to any disclaimer, the term of this patent is extended or adjusted under 35 U.S.C. 154(b) by 410 days.

(21) Appl. No.: 14/597,072

(22) Filed: Jan. 14, 2015

(65) Prior Publication Data

US 2015/0199689 A1   Jul. 16, 2015

Related U.S. Application Data

(60) Provisional application No. 61/927,381, filed on Jan. 14, 2014.

(51) Int. Cl.

| | | |
|---|---|---|
| *G06Q 40/00* | (2012.01) | |
| *G07D 11/00* | (2006.01) | |
| *G06F 19/00* | (2011.01) | |
| *G06Q 20/40* | (2012.01) | |
| *G06Q 20/36* | (2012.01) | |

(52) U.S. Cl.
CPC ..... *G06Q 20/4016* (2013.01); *G06Q 20/3674* (2013.01)

(58) Field of Classification Search
CPC ........ G06Q 40/00; G06Q 20/00; G07D 11/00; G06F 19/00; G06F 17/00; G06K 5/00; G06K 19/00
USPC .... 235/379, 375, 487, 382, 380; 705/67, 71, 705/44
See application file for complete search history.

(56) References Cited

U.S. PATENT DOCUMENTS

| | | |
|---|---|---|
| 5,613,012 A | 3/1997 | Hoffman et al. |
| 5,781,438 A | 7/1998 | Lee et al. |
| 5,883,810 A | 3/1999 | Franklin et al. |
| 5,953,710 A | 9/1999 | Fleming |
| 5,956,699 A | 9/1999 | Wong et al. |
| 6,000,832 A | 12/1999 | Franklin et al. |
| 6,014,635 A | 1/2000 | Harris et al. |

(Continued)

FOREIGN PATENT DOCUMENTS

| | | |
|---|---|---|
| EP | 2156397 A1 | 2/2010 |
| WO | 0135304 A1 | 5/2001 |

(Continued)

OTHER PUBLICATIONS

Wang, U.S. Appl. No. 62/000,288 (unpublished), Payment System Canonical Address Format filed May 19, 2014.

(Continued)

*Primary Examiner* — Edwyn Labaze
(74) *Attorney, Agent, or Firm* — Kilpatrick Townsend & Stockton LLP

(57) ABSTRACT

A method for utilizing a non-transactable account identifier with a payment token is disclosed. The non-transactable account identifier can have the same format as a primary account number (PAN) and the payment token, but is not used to conduct a payment transaction.

20 Claims, 5 Drawing Sheets

(56) References Cited

U.S. PATENT DOCUMENTS

| | | |
|---|---|---|
| 6,044,360 A | 3/2000 | Picciallo |
| 6,163,771 A | 12/2000 | Walker et al. |
| 6,227,447 B1 | 5/2001 | Campisano |
| 6,236,981 B1 | 5/2001 | Hill |
| 6,267,292 B1 | 7/2001 | Walker et al. |
| 6,327,578 B1 | 12/2001 | Linehan |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,592,044 B1 | 7/2003 | Wong et al. |
| 6,636,833 B1 | 10/2003 | Flitcroft et al. |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,051,929 B2 | 5/2006 | Li |
| 7,069,249 B2 | 6/2006 | Stolfo et al. |
| 7,103,576 B2 | 9/2006 | Mann, III et al. |
| 7,113,930 B2 | 9/2006 | Eccles et al. |
| 7,136,835 B1 | 11/2006 | Flitcroft et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| RE40,444 E | 7/2008 | Linehan |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,548,889 B2 | 6/2009 | Bhambri et al. |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,593,896 B1 | 9/2009 | Flitcroft et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,650,314 B1 | 1/2010 | Saunders |
| 7,685,037 B2 | 3/2010 | Reiners et al. |
| 7,702,578 B2 | 4/2010 | Fung et al. |
| 7,707,120 B2 | 4/2010 | Dominguez et al. |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,818,264 B2 | 10/2010 | Hammad |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Hewton |
| 7,844,550 B2 | 11/2010 | Walker et al. |
| 7,848,980 B2 | 12/2010 | Carlson |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,908,216 B1 | 3/2011 | Davis et al. |
| 7,922,082 B2 | 4/2011 | Muscato |
| 7,931,195 B2 | 4/2011 | Mullen |
| 7,938,318 B2 | 5/2011 | Fein et al. |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,171,525 B1 | 5/2012 | Pelly et al. |
| 8,196,813 B2 | 6/2012 | Vadhri |
| 8,205,791 B2 | 6/2012 | Randazza et al. |
| 8,219,489 B2 | 7/2012 | Patterson |
| 8,224,702 B2 | 7/2012 | Mengerink et al. |
| 8,225,385 B2 | 7/2012 | Chow et al. |
| 8,229,852 B2 | 7/2012 | Carlson |
| 8,265,993 B2 | 9/2012 | Chien et al. |
| 8,280,777 B2 | 10/2012 | Mengerink et al. |
| 8,281,991 B2 | 10/2012 | Wentker et al. |
| 8,328,095 B2 | 12/2012 | Oder, II et al. |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren et al. |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |

(56) References Cited

U.S. PATENT DOCUMENTS

| | | |
|---|---|---|
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | Von Behren et al. |
| 8,651,374 B2 | 2/2014 | Brabson et al. |
| 8,656,180 B2 | 2/2014 | Shablygin et al. |
| 8,751,391 B2 | 6/2014 | Freund |
| 8,762,263 B2 | 6/2014 | Gauthier et al. |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0073045 A1 | 6/2002 | Rubin et al. |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0130955 A1 | 7/2003 | Hawthorne |
| 2003/0191709 A1 | 10/2003 | Elston et al. |
| 2003/0191945 A1 | 10/2003 | Keech |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0093281 A1 | 5/2004 | Silverstein et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0260646 A1 | 12/2004 | Berardi et al. |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0201264 A1 | 8/2008 | Brown et al. |
| 2008/0201265 A1 | 8/2008 | Hewton |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |
| 2009/0106112 A1 | 4/2009 | Dalmia et al. |
| 2009/0106160 A1 | 4/2009 | Skowronek |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru et al. |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0047076 A1 | 2/2011 | Carlson et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0125597 A1 | 5/2011 | Oder, II et al. |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park et al. |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |

(56) References Cited

U.S. PATENT DOCUMENTS

| | | |
|---|---|---|
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0259782 A1 | 10/2012 | Hammad |
| 2012/0265631 A1 | 10/2012 | Cronic et al. |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0018793 A1* | 1/2013 | Wong ............... G06Q 20/4097 705/44 |
| 2013/0019098 A1 | 1/2013 | Gupta et al. |
| 2013/0031006 A1 | 1/2013 | Mccullagh et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder, II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | Von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |

(56) References Cited

U.S. PATENT DOCUMENTS

| | | | |
|---|---|---|---|
| 2014/0164243 | A1 | 6/2014 | Aabye et al. |
| 2014/0188586 | A1 | 7/2014 | Carpenter et al. |
| 2014/0294701 | A1 | 10/2014 | Dai et al. |
| 2014/0310183 | A1 | 10/2014 | Weber |
| 2014/0330721 | A1 | 11/2014 | Wang |
| 2014/0330722 | A1 | 11/2014 | Laxminarayanan et al. |
| 2014/0331265 | A1 | 11/2014 | Mozell et al. |
| 2014/0337217 | A1* | 11/2014 | Howe ............... G06Q 20/4016 705/44 |
| 2014/0337236 | A1 | 11/2014 | Wong et al. |
| 2014/0344153 | A1 | 11/2014 | Raj et al. |
| 2014/0372308 | A1 | 12/2014 | Sheets |
| 2015/0019443 | A1 | 1/2015 | Sheets et al. |
| 2015/0032625 | A1 | 1/2015 | Dill et al. |
| 2015/0032626 | A1 | 1/2015 | Dill et al. |
| 2015/0032627 | A1 | 1/2015 | Dill et al. |
| 2015/0046338 | A1 | 2/2015 | Laxminarayanan et al. |
| 2015/0046339 | A1 | 2/2015 | Wong et al. |
| 2015/0052064 | A1 | 2/2015 | Karpenko et al. |
| 2015/0088756 | A1 | 3/2015 | Makhotin et al. |
| 2015/0106239 | A1 | 4/2015 | Gaddam et al. |
| 2015/0112870 | A1 | 4/2015 | Nagasundaram et al. |
| 2015/0112871 | A1 | 4/2015 | Kumnick |
| 2015/0120472 | A1 | 4/2015 | Aabye et al. |
| 2015/0127529 | A1 | 5/2015 | Makhotin et al. |
| 2015/0127547 | A1 | 5/2015 | Powell et al. |
| 2015/0140960 | A1 | 5/2015 | Powell et al. |
| 2015/0142673 | A1 | 5/2015 | Nelsen et al. |
| 2015/0161597 | A1 | 6/2015 | Subramanian et al. |
| 2015/0178724 | A1 | 6/2015 | Ngo et al. |
| 2015/0180836 | A1 | 6/2015 | Wong et al. |
| 2015/0186864 | A1 | 7/2015 | Jones et al. |
| 2015/0193222 | A1 | 7/2015 | Pirzadeh et al. |
| 2015/0195133 | A1 | 7/2015 | Sheets et al. |
| 2015/0199679 | A1 | 7/2015 | Palanisamy et al. |
| 2015/0220917 | A1 | 8/2015 | Aabye et al. |
| 2015/0269566 | A1 | 9/2015 | Gaddam et al. |
| 2015/0312038 | A1 | 10/2015 | Palanisamy |
| 2015/0319158 | A1 | 11/2015 | Kumnick |
| 2015/0332262 | A1 | 11/2015 | Lingappa |
| 2015/0356560 | A1 | 12/2015 | Shastry et al. |
| 2016/0028550 | A1 | 1/2016 | Gaddam et al. |
| 2016/0042263 | A1 | 2/2016 | Gaddam et al. |
| 2016/0065370 | A1 | 3/2016 | Le Saint et al. |
| 2016/0092696 | A1 | 3/2016 | Guglani et al. |
| 2016/0092872 | A1 | 3/2016 | Prakash et al. |
| 2016/0103675 | A1 | 4/2016 | Aabye et al. |
| 2016/0119296 | A1 | 4/2016 | Laxminarayanan et al. |

FOREIGN PATENT DOCUMENTS

| | | |
|---|---|---|
| WO | 0135304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Sharma et al., U.S. Appl. No. 62/003,717 (unpublished), Mobile Merchant Application filed May 28, 2014.

Kalgi et al., U.S. Appl. No. 62/024,426, (unpublished) Secure Transactions Using Mobile Devices filed Jul. 14, 2014.

Prakash et al., U.S. Appl. No. 62/037,033 (unpublished), Sharing Payment Token filed Aug. 13, 2014.

Hoverson et al., U.S. Appl. No. 62/038,174 (unpublished), Customized Payment Gateway filed Aug. 15, 2014.

Wang, U.S. Appl. No. 62/042,050 (unpublished), Payment Device Authentication and Authorization System filed Aug. 26, 2014.

Gaddam et al., U.S. Appl. No. 62/053,736 (unpublished), Completing Transactions Without a User Payment Device filed Sep. 22, 2014.

Patterson, U.S. Appl. No. 62/054,346 (unpublished), Mirrored Token Vault filed Sep. 23, 2014.

Dimmick, U.S. Appl. No. 14/952,514 (unpublished), Systems Communications With Non-Sensitive Identifiers filed Nov. 25, 2015.

Dimmick, U.S. Appl. No. 14/952,444 (unpublished), Tokenization Request Via Access Device filed Nov. 25, 2015.

Prakash et al., U.S. Appl. No. 14/955,716 (unpublished), Provisioning Platform for Machine-To-Machine Devices filed Dec. 1, 2015.

Wong et al., U.S. Appl. No. 14/966,948 (unpublished), Automated Access Data Provisioning filed Dec. 11, 2015.

Stubbs et al., U.S. Appl. No. 62/103,522 (unpublished), Methods and Systems for Wallet Provider Provisioning filed Jan. 14, 2015.

Mcguire, U.S. Appl. No. 14/600,523 (unpublished), Secure Payment Processing Using Authorization Request filed Jan. 20, 2015.

Flurscheim et al., U.S. Appl. No. 15/004,705 (unpublished), Cloud-Based Transactions With Magnetic Secure Transmission filed Jan. 22, 2016.

Flurscheim et al., U.S. Appl. No. 62/108,403 (unpublished), Wearables With NFC HCE filed Jan. 27, 2015.

Sabba et al., U.S. Appl. No. 15/011,366 (unpublished), Token Check Offline filed Jan. 29, 2016.

Patterson, U.S. Appl. No. 15/019,157 (unpublished), Token Processing Utilizing Multiple Authorizations filed Feb. 9, 2016.

Cash et al., U.S. Appl. No. 15/041,495 (unpublished), Peer Forward Authorization of Digital Requests filed Feb. 11, 2016.

Le Saint et al., U.S. Appl. No. 15/008,388 (unpublished), Methods for Secure Credential Provisioning filed Jan. 27, 2016.

Kinagi, U.S. Appl. No. 62/117,291 (unpublished), Token and Cryptogram Using Transaction Specific Information filed Feb. 17, 2015.

Galland et al. U.S. Appl. No. 62/128,709 (unpublished), Tokenizing Transaction Amounts filed Mar. 5, 2015.

Rangarajan et al., U.S. Appl. No. 61/751,763 (unpublished), Payments Bridge filed Jan. 11, 2013.

Li, U.S. Appl. No. 61/894,749 (unpublished), Methods and Systems for Authentication and Issuance of Tokens in a Secure Environment filed Oct. 23, 2013.

Aissi et al., U.S. Appl. No. 61/738,832 (unpublished), Management of Sensitive Data filed Dec. 18, 2012.

Wong et al., U.S. Appl. No. 61/879,362 (unpublished), Systems and Methods for Managing Mobile Cardholder Verification Methods filed Sep. 18, 2013.

Powell, U.S. Appl. No. 61/892,407 (unpublished), Issuer Over-The-Air Update Method and System filed Oct. 17, 2013.

Powell, U.S. Appl. No. 61/926,236 (unpublished), Methods and Systems for Provisioning Mobile Devices With Payment Credentials and Payment Token Identifiers filed Jan. 10, 2014.

Petition for Inter Partes Review of U.S. Pat. No. 8,533,860 Challenging Claims 130 Under 35 U.S.C. § 312 and 37 C.F.R. § 42.104, filed Feb. 17, 2016, Before the USPTO Patent Trial and Appeal Board, IPR 2016-00600, 65 pages.

* cited by examiner

PAYMENT ACCOUNT IDENTIFIER SYSTEM

CROSS REFERENCE TO RELATED APPLICATIONS

This application is a non-provisional application of and claims the benefit of the filing date of U.S. Provisional Application No. 61/927,381, filed on Jan. 14, 2014, which is herein incorporated by reference in its entirety for all purposes.

BACKGROUND

In the current payments ecosystem, merchants, processors and acquirers currently use PANs (primary account numbers) to process payment transactions and to identify cardholders for loyalty programs, fraud checks and reporting.

While the use of PANs for such purposes has been useful, the use of PANs as accountholder identification mechanisms is problematic. If PANs are retained by merchants, for example, the merchants will need to be PCI (payment card industry) compliant. To be PCI compliant, merchants need to take a number of steps to improve the security of their data systems. Such steps can be resource and time intensive to implement and maintain.

One way to avoid the need to be PCI compliant is to use payment tokens or "tokens" instead of PANs. Tokens can be substitutes for real PANs. A token can be used in place of a real PAN in a payment transaction. If the token is stolen by an unauthorized user (e.g., a hacker), then a new token can be issued in place of the token that was stolen. In this situation, the underlying real PAN is protected and the consumer's basic account information need not be re-issued.

Although the use of tokens is desirable, the number of tokens used in a particular payments ecosystem can be very large. In some cases, each accountholder PAN can be mapped to multiple tokens (1–N mapping). For example, if a PAN is used in multiple digital wallets, each wallet instance can have a different static token for the same cardholder PAN. In another example, a different token relating to a PAN can be issued for each transaction.

Because the number of tokens corresponding to a single PAN is unknown to an entity such as merchant, and because a token is intended to obscure a real PAN, it is difficult if not impossible for an entity such as a merchant to determine who the accountholder is if the merchant is in possession of the token. As such, in a conventional token based payments system, entities such as merchants are unable to perform fraud processing, operate loyalty programs, and other processes that would necessarily require them to know who the accountholder is or might be.

Embodiments of the invention address these and other problems, individually and collectively.

SUMMARY

Embodiments of the invention can relate to systems and methods that can utilize payment tokens and non-transactable payment account identifiers. In some embodiments of the invention, a non-transactable payment account identifier may have the same format as a PAN. Because of this, an entity's existing processing system (i.e., systems that process PANs) can utilize the non-transactable payment account identifier much like it would for a real PAN. However, unlike a PAN or a transactable payment token, the non-transactable payment account identifier cannot be used to conduct a payment transaction. Consequently, the non-transactable payment account identifiers according to embodiments of the invention can be stored and used by entities such as merchants, acquirers, and program operators to perform operations including loyalty processing, fraud processing, and reporting, even though tokens are used to conduct payment transactions. As such, such entities do not need to be PCI compliant.

One embodiment of the invention is directed to a method. The method comprises receiving, by a token service computer, a token request comprising a primary account identifier from a token requestor computer, and then determining, by the token service computer, a transactable payment token and a non-transactable payment account identifier associated with the primary account identifier. The method also includes transmitting, by the token service computer, the transactable payment token and the non-transactable payment account identifier to the token requestor computer. If the token requestor computer is not a consumer's payment device, the token requestor computer may provide the transactable payment token and the non-transactable payment account identifier to the payment device. The transactable payment token and the non-transactable payment account identifier can then be passed from the consumer's payment device to an access device to conduct a transaction. The transactable payment token can be used by the access device to process a payment for the transaction instead of the primary account identifier, while the non-transactable payment account identifier can be used as a reference for the primary account identifier to perform an operation that is not a payment transaction.

Another embodiment of the invention is directed to a token service computer configured to perform the above-described method.

Another embodiment of the invention is directed to a method comprising receiving, by a token service system, a token request associated with account information and then determining a non-transactable payment account identifier and a payment token. The method also includes providing the non-transactable payment account identifier and a token associated with the account information, and then receiving an authorization request message including the token and the non-transactable payment account identifier from a merchant. The method also includes adding the account information to the authorization request message and sending the authorization request message to an issuer. The method further includes receiving an authorization response message including the account information from the issuer and replacing the account information with the transactable payment token and the non-transactable payment account identifier in the authorization response message. The method further includes sending the authorization response message to the merchant.

Another embodiment of the invention is directed to a token service system configured to perform the above-described method.

Further details regarding embodiments of the invention can be found in the Detailed Description and the Figures.

DETAILED DESCRIPTION

Figure 1:
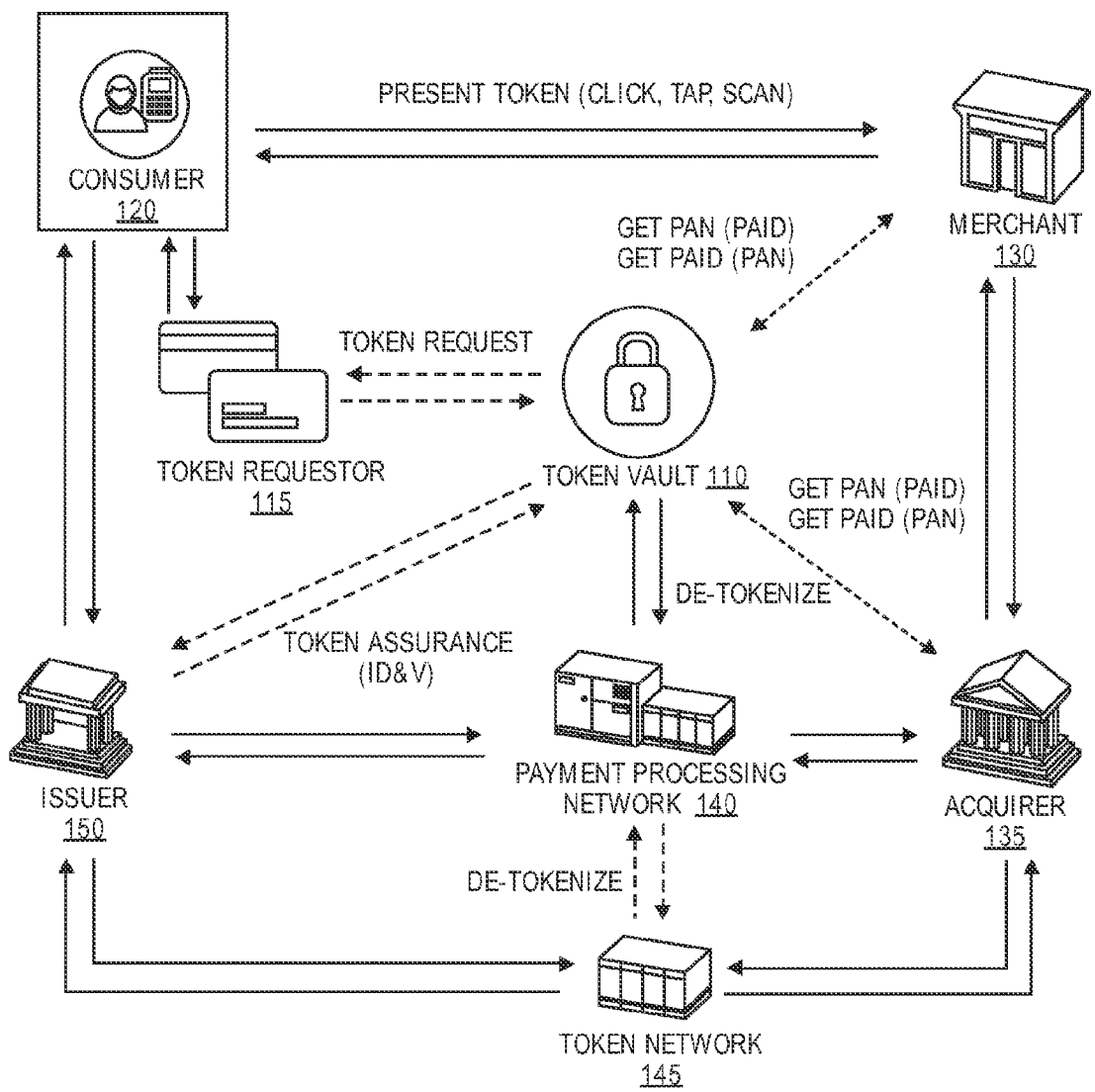
FIG. 1 shows a block diagram of a system according to an embodiment of the invention.

Embodiments of the invention use a non-transactable payment account identifier to allow entities (e.g., merchant, acquirer, etc.) within a transaction eco-system to identify an accountholder when using tokens in lieu of traditional PANs. The non-transactable payment account identifier enables entities such as merchants and acquirers to identify accountholders when using transactable payment tokens for various applications. Such applications include, but are not limited to: fraud and risk checks on transaction authorization requests, fraud and risk reviews after transactions are completed, performance of value added services (e.g., loyalty, backend applications, reporting), and transaction feeds for third party value added applications.

Prior to discussing specific embodiments of the invention, some terms may be described in detail.

A "non-transactable payment account identifier" (alternatively referred to as a "PAID") may be any string of characters that identify an accountholder and that is not used to conduct a payment transaction on an underlying account. For example, in some embodiments, a non-transactable payment account identifier may be 16-19 digits (or any other suitable length) and may be based on the format and rules of a PAN (primary account number). The non-transactable payment account identifier may be static over time and any number of transactions. A non-transactable account identifier may have a BIN (bank identification number) that is the same as the BIN for the corresponding real account identifier. Alternatively, it may have a BIN that is derived from or completely random with respect to the real BIN. The BIN in the non-transactable account identifier could also be a static tokenized BIN.

In some embodiments, the non-transactable payment account identifier may include one or more characters that may indicate that it cannot be used to conduct a payment transaction. For example, it could be that all non-transactable payment account identifiers may start with the characters "99." Any data strings that are similar in length to a real PAN in any transaction request messages would be treated by any suitable payment processing computers as being non-transactable. In other embodiments, non-transactable payment account identifiers may not be readily identified as being non-transactable by an outside observer. For example, a token service computer (e.g., a token vault) may generate a list of non-transactable payment account identifiers, and that list may be distributed by the token service computer to any entity (e.g., a merchant) that may wish to store or use the non-transactable payment account identifiers. If one tries to use the non-transactable payment account identifier to conduct a transaction, it will not be processed and/or routed by one or more computers in the payments system.

"Payment account information" may be any information that identifies or is associated with a payment account. Payment account information may be provided in order to make a payment from a payment account. Some examples of payment account information include one or more of a PAN (primary account number), a CVV (card verification value), a dCVV (dynamic card verification value), a user name, an expiration date, a gift card number or code, etc.

A "real account identifier" may include a transactable identifier associated with a payment account that directly represents the payment account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (e.g., a "BIN" or bank identification number) that may identify an issuer associated with the real account identifier.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other-information which may be replaced with a substitute value (i.e., token). Tokenization may be used to enhance transaction efficiency, improve transaction security, increase service transparency, or to provide a method for third-party enablement.

"Token exchange" or "de-tokenization" can include a process of restoring the data that was substituted during tokenization. For example, a token exchange may include replacing a payment token with a corresponding primary account number (PAN) that was associated with the payment token during tokenization of the PAN. Thus, the de-tokenization may refer to the process of redeeming a token for the associated PAN value based on a token-to-PAN mapping stored, for example, in a token vault. The ability to retrieve a PAN in exchange for the associated token may be restricted to specifically authorized entities, individuals, applications, or systems. Further, de-tokenization or token exchange may be applied to any other information. In some embodiments, token exchange may be achieved via a transactional message, such as an ISO message, an application programming interface (API), or another type of web interface (e.g., web request).

A "transactable payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "Bank Identification Number (BIN)" may be a number that identifies a bank. A BIN may be assigned by a payment network to an issuer of a payment account. BINs may be consistent with industry account and issuer identification specifications (e.g. ISO 7812) such that the payment network assigning the BIN may be identified based on the BIN and associated account ranges.

A "token BIN" may refer to a specific BIN that has been designated only for the purpose of issuing tokens and may be flagged accordingly in BIN tables. Token BINs may not have a dual purpose and may not be used to issue both primary account numbers (PANs) and tokens.

A "token issuer identifier range (issuer BIN range)" may refer to a unique identifier (e.g., of 6 to 12 digits length) originating from a set of pre-allocated token issuer identifiers (e.g., 6 digit token BINs). For example, in some embodiments, one or more token BIN ranges can be allocated to each issuer BIN range that is associated with an issuer. In some embodiments, the token BIN ranges may be used to generate a payment token and may not be used to generate a non-payment token. In some embodiments, a token may pass the basic validation rules of an account number including, for example, a LUHN check or checksum validation that may be set up by different entities within the payment system. In some embodiments, a payment token issuer identifier may be mapped to a real issuer identifier (e.g., a BIN) for an issuer. For example, a payment token issuer identifier may include a six digit numerical value that may be associated with an issuer. For instance, any token including the payment token issuer identifier may be associated with a particular issuer. As such, the issuer may be identified using the corresponding issuer identifier range associated with the token issuer identifier. For example, a payment token issuer identifier "490000" corresponding to a payment token "4900 0000 0000 0001" can be mapped to an issuer identifier "414709" corresponding to a payment account identifier "4147 0900 0000 1234". In some embodiments, a payment token issuer identifier is static for an issuer. For example, a payment token issuer identifier (e.g., "490000") may correspond to a first issuer and another payment token issuer identifier (e.g., "520000") may correspond to a second issuer, and the first and second payment token issuer identifiers may not be changed or altered without informing all entities within the network token processing system. In some embodiments, a payment token issuer identifier range may correspond to an issuer identifier. For example, payment tokens including payment token issuer identifiers from "490000"-"490002" may correspond to a first issuer (e.g., mapped to issuer identifier "414709") and payment tokens including payment token issuer identifiers from "520000"-"520002" may correspond to a second issuer (e.g., mapped to real issuer identifier "417548"). Token BIN Ranges and assignment of tokens from these BIN ranges may be made available to the parties (e.g., via routing tables) accepting the transaction to make routing decisions.

A "token service system" can include a system that that services payment tokens. In some embodiments, a token service system can facilitate requesting, determining (e.g., generating) and/or issuing tokens, as well as maintaining an established mapping of tokens to primary account numbers (PANs) in a repository (e.g. token vault). In some embodiments, the token service system may establish a token assurance level for a given token to indicate the confidence level of the token to PAN binding. The token service system may support token processing of payment transactions submitted using tokens by de-tokenizing the token to obtain the actual PAN. In some embodiments, a token service system may include a token service computer alone, or in combination with other computers such as a payment processing network computer.

A "token service provider" may include an entity that services payment tokens. In some embodiments, the token service provider may operate one or more server computers in a token service system that generate, process and maintain tokens. The token service provider may include or be in communication with a token vault where the generated tokens are stored. Specifically, the token vault may maintain one-to-one mapping between a token and a primary account number (PAN) represented by the token. The token service provider may have the ability to set aside licensed BINs as token BINs to issue tokens for the PANs that may be submitted to the token service provider. Various entities of a tokenization ecosystem may assume the roles of the token service provider. For example, payment networks and issuers or their agents may become the token service provider by implementing the token services according to embodiments of the present invention. A token service provider may provide reports or data output to reporting tools regarding approved, pending, or declined token requests, including any assigned token requestor IDs. The token service provider may provide data output related to token-based transactions to reporting tools and applications and present the token and/or PAN as appropriate in the reporting output.

A "token vault" may be an example of a token service computer and can include a repository that maintains established token-to-PAN mappings. According to various embodiments, the token vault may also maintain other attributes of the token requestor that may be determined at the time of registration. The attributes may be used by the token service provider to apply domain restrictions or other controls during transaction processing. In some embodiments, the token vault may be a part of the token service system or the token service provider. Alternatively, the token vault may be a remote repository accessible to the token service provider. Token vaults, due to the sensitive nature of the data mappings that are stored and managed in them, may be protected by strong underlying physical and logical security.

An "identification and verification (ID&V) method" may be used to evaluate whether the person conducting the transaction is the legitimate account holder. Examples of ID&V methods may include, but are not limited to, an account verification message, a risk score based on assessment of the primary account number (PAN) and use of one time password by the issuer or its agent to verify the account holder. Exemplary ID&V methods may be performed using information such as a user signature, a password, an offline or online personal identification number (PIN), an offline or online enciphered PIN, a combination of offline PIN and signature, a combination of offline enciphered PIN and signature, user biometrics (e.g. voice recognition, fingerprint matching, etc.), a pattern, a glyph, knowledge-based challenge-responses, hardware tokens (multiple solution options), one time passwords (OTPs) with limited use, software tokens, two-channel authentication processes (e.g., via phone), etc. Using the ID&V, a confidence level may be established with respect to the token to PAN binding.

A "token assurance level" may include an indicator or a value that allows the token service provider to indicate the confidence level of the token to PAN binding. The token assurance level may be determined by the token service provider based on the type of identification and verification (ID&V) performed and the entity that performed the ID&V. The token assurance level may be set when issuing the token. The token assurance level may be updated if additional ID&V is performed.

A "requested token assurance level" may include a token assurance level requested by the token requestor. The requested token assurance level may be included in a field of a token request message sent by the requestor to the token service provider for the generation/issuance of the token.

An "assigned token assurance level" may include an actual (i.e. generated) value assigned by the token service provider to the token as the result of the identification and verification (ID&V) process performed by an entity within the tokenization ecosystem. The assigned token assurance level may be provided back to the token requestor in response to the token request message. The assigned token assurance level may be different than the requested token assurance level included in the token request message.

"Token attributes" may include any feature or information about a token. For example, token attributes may include information that can determine how a token can be used, delivered, issued, or otherwise how data may be manipulated within a transaction system. For example, the token attributes may include a type of token, frequency of use, token expiry date and/or expiry time, a number of associated tokens, a transaction lifecycle expiry date, and any additional information that may be relevant to any entity within a tokenization ecosystem. For example, token attributes may include a wallet identifier associated with the token, an additional account alias or other user account identifier (e.g., an email address, username, etc.), a device identifier, an invoice number, etc. In some embodiments, a token requestor may provide token attributes at the time of requesting the generation of tokens. In some embodiments, a network token system, payment network associated with the network token system, an issuer, or any other entity associated with the token may determine and/or provide the token attributes associated with a particular token.

A "token presentment mode" may indicate a method through which a token is submitted for a transaction. Some non-limiting examples of the token presentment mode may include machine readable codes (e.g., quick response code (QRC), barcode, etc.), mobile contactless modes (e.g., near-field communication (NFC) communication), e-commerce remote modes, e-commerce proximity modes, and any other suitable modes in which to submit a token. Tokens may be provided through any number of different methods. For example, in one implementation, a token may be embedded in machine-readable code which may be generated by a wallet provider, mobile application, or other application on mobile device and displayed on a display of the mobile device. The machine readable code can be scanned at the POS through which the token is passed to the merchant. A mobile contactless mode may include passing the token through NFC in a contactless message. An e-commerce remote mode may include submitting a token by a consumer or a wallet provider through an online transaction or as an e-commerce transaction using a merchant application or other mobile application. An e-commerce proximity mode may include submitting a token by a consumer from a wallet application on a mobile device at a merchant location.

A "token requestor" include an entity that requests a token. The token requestor may initiate a request that a primary account number (PAN) be tokenized by submitting a token request message to the token service provider. According to various embodiments, a token requestor may no longer need to store a PAN associated with a token once the requestor has received a requested token. The requestor may be an application, a device, a process, or a system that is configured to perform actions associated with tokens. A token requestor can request registration with a network token system, request token generation, token activation, token de-activation, token exchange, token lifecycle management related processes, and/or any other token related processes. A requestor may interface with a network token system through any suitable communication networks and/or protocols (e.g., using HTTPS, SOAP and/or an XML interface among others). Some non-limiting examples of token requestors may include, for example, communication devices (e.g., mobile phones and computers) operated by consumers, card-on-file merchants, acquirers, acquirer processors, and payment gateways acting on behalf of merchants, payment enablers (e.g., original equipment manufacturers, mobile network operators, etc.), digital wallet providers, issuers, third party wallet providers, and/or payment processing networks. In some embodiments, a token requestor can request tokens for multiple domains and/or channels. A token requestor may be registered and identified uniquely by the token service provider within the tokenization ecosystem. During token requestor registration, the token service provider may formally process the token requestor's application to participate in the token service system. The token service provider may collect information pertaining to the nature of the requestor and the relevant use of tokens to validate and formally approve the token requestor and establish appropriate domain restriction controls. Successfully registered token requestors may be assigned a token requestor identifier that may also be entered and maintained within the token vault. Token requestors be revoked or assigned new token requestor identifiers. This information may be subject to reporting and audit by the token service provider.

A "token requestor identifier (ID)" may include an identifier for a token requestor. It may include any characters, numerals, or other identifiers associated with an entity associated with a network token system. In some embodiments, a unique token requestor ID may be assigned for each domain for a token request associated with the same token requestor. For example, a token requestor ID can identify a pairing of a token requestor (e.g., a mobile device, a mobile wallet provider, etc.) with a token domain (e.g., e-commerce, contactless, etc.). A token requestor ID may include any format or type of information. For example, in one embodiment, the token requestor ID may include an alpha-numerical value such as a ten digit or an eleven digit letter and/or number (e.g., 4678012345). In some embodiments, a token requestor ID may include a code for a token service provider (e.g., first 3 digits) such as the network token system and the remaining digits may be assigned by the token service provider for each requesting entity (e.g., mobile wallet provider) and the token domain (e.g., contactless, e-commerce, etc.).

A "token request indicator" may refer to an indicator used to indicate that a message is related to a token request. The token request indicator may optionally be passed to the issuer as part of the Identification and Verification (ID&V) method to inform the issuer of the reason the account status check is being performed.

A "token domain" may indicate the factors that can be established at the time of token issuance to enable appropriate usage of the token for payment transactions. Examples of the token domain may include, but are not limited to, a POS entry mode, and merchant identifiers to uniquely identify where the token can be used. A set of parameters (i.e. token domain restriction controls) may be established as part of token issuance by the token service provider that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction.

"Token expiry date" may refer to the expiration date/time of the token. The token expiry date may be passed among the entities of the tokenization ecosystem during transaction processing to ensure interoperability. The token expiration date may be a numeric value (e.g. a 4-digit numeric value).

A "consumer" may include an individual or a user that may be associated with one or more personal accounts and/or consumer devices. The consumer may also be referred to as a cardholder, account holder, or user.

An "access device" may be any suitable device for communicating with a merchant computer or payment processing network, and for interacting with a payment device, a user computer apparatus, and/or a user mobile device. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites on remote server computers, and the like. An access device may use any suitable contact or contactless mode of operation to send or receive data from, or associated with, a payment device and/or a user mobile device.

In some embodiments, the access device may be a POS terminal. A POS terminal may include a payment device reader, a processor, and a computer-readable medium. The reader may utilize any suitable contact or contactless mode of operation. For example, exemplary card readers can include radio frequency (RF) antennas, optical scanners, bar code readers, or magnetic stripe readers.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a user name, an expiration date, etc. An authorization request message may also comprise "transaction information," such as any information associated with a current transaction, such as the transaction amount, merchant identifier, merchant location, acquirer bank identification number (BIN), card acceptor ID, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

An "issuer" may typically refer to a business entity (e.g., a bank) that maintains an account for a user that is associated with a portable communication device such as an account enrolled in a mobile application installed on a portable communication device.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers.

FIG. 1 shows a system 100 comprising a number of components. The system 100 comprises a token vault 110, which may be an example of at least part of a token service provider computer. The token vault 110 may be in communication with one or more of a token requestor 115, a merchant 130, an acquirer 135, a payment processing network 140, and an issuer 150. Each of the token requestor 115, the merchant 130, the acquirer 135, the payment processing network 140, and the issuer 150 may be embodied by one or more computers.

The consumer 120 (i.e., a device operated by the consumer 120) may be in communication with the token requestor 115, the issuer 150, and the merchant 130. Furthermore, the merchant 130, the acquirer 135, the payment processing network 140, the issuer 150, and a token network 145 may all be in operative communication with each other through any suitable communication channel or communications network. A suitable communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

The token vault 110 may be associated with the payment processing network 140, the issuer 150, the acquirer 135, or the merchant 130. The token vault 110 can receive a token request from the token requestor 115, the request including information (e.g., a PAN) that identifies a payment account. The token vault 110 can issue a token that can be used as surrogate payment account information. A record of the token may be stored at the token vault 110, and the record may include the token, token expiration date, associated payment account information, token assurance information, token requestor information, and/or any other suitable information.

The token vault 110 may also generate a unique non-transactable payment account identifier that may be a static non-payment identifier. The token vault 110 may associate the non-transactable payment account identifier with a PAN, so that the non-transactable payment account identifier is associated with a payment account.

In addition to providing the token, the token vault 110 may provide a non-transactable payment account identifier to the token requestor 115 in response to a token request. Thus, the token vault 110 can provide both payment information (via a token) and identification (via a non-transactable payment account identifier) without providing the actual PAN associated with the payment account. In some embodiments, the non-transactable payment account identifier may first be generated and associated with the payment account the first time a token is requested for the payment account. The non-transactable payment account identifier may be identified and provided along with tokens in response to any future token requests.

The token vault 110 may also be capable of de-tokenizing a token and providing payment account information in response to receiving the token. For example, the token vault 110 may receive requests for payment account information from the payment processing network 140, issuer 150, acquirer 135, and/or merchant 130. The token vault 110 may receive a de-tokenization request including a token, identify payment account information that is associated with the token, and provide the payment account information to the de-tokenization requestor.

The token vault 110 may be an example of a token service computer. The token service computer may comprise a processor and a computer readable medium. The computer readable medium comprising code, executable by the processor, for implementing a method. The method comprises receiving a token request comprising a primary account identifier from a token requestor computer, determining a transactable payment token and a non-transactable payment account identifier associated with the primary account identifier, and transmitting the transactable payment token and the non-transactable payment account identifier to the token requestor computer. If the token requestor computer is not a payment device, the token requestor computer passes the transactable payment token and the non-transactable payment account identifier to the payment device. The transactable payment token and the non-transactable payment account identifier are both passed from the consumer's payment device to an access device to conduct a transaction. The transactable payment token is used by the access device to process a payment for the transaction instead of the primary account identifier. The non-transactable payment account identifier is used as a reference for the primary account identifier to perform an operation that is not a payment transaction.

In some embodiments, the de-tokenization requestor may be the payment processing network 140, which may request the payment account information for authorization purposes. In some embodiments, the de-tokenization requestor may be the merchant 130 which may wish to have the payment account information for consumer 120 identification purposes.

The token requestor 115 may request a token on behalf of the consumer 120. The token requestor 115 may be a digital wallet provider, a merchant 130, payment processing network 140, a payment device (e.g., the consumer's mobile phone), or any other suitable entity. The consumer 120 may wish to purchase a good and/or service from the merchant 130 and the token requestor 115 may retrieve a token from the token vault 110 for the consumer 120 to use for the purchase.

The merchant 130 is capable providing goods and/or services to the consumer 120. In some embodiments, the merchant 130 may receive payment information comprising a token and a non-transactable payment account identifier from the consumer 120 (i.e., a payment device operated by the consumer 120) in a payment transaction. After receiving the token and the non-transactable payment account identifier, the merchant 130 may send the token and the non-transactable payment account identifier to the acquirer 135 for payment authorization.

In some embodiments, the merchant 130 may use the non-transactable payment account identifier for tracking consumer activity. The non-transactable payment account identifier may be static, so that the same non-transactable payment account identifier is provided each time a consumer 120 uses a certain payment account at a merchant 130, even if the token is variable. For example, in some embodiments, one payment account may be associated with several digital wallets, and each digital wallet may have a different token associated with the same payment account. The merchant 130 may receive the same non-transactable payment account identifier whenever any of these different tokens are received. Thus, the merchant 130 may be able to recognize a payment account by a received non-transactable payment account identifier. It is also possible for the merchant 130 (or other party) to request that the consumer that is associated with the non-transactable account identifier provide additional information about the consumer (e.g., name, home address, telephone number, zip code, etc.) so that the merchant 130 has additional information to link the consumer to the non-transactable account identifier.

The merchant 130 may use the non-transactable payment account identifier as a consumer identifier instead of a PAN. The merchant 130 may keep a record of consumer 120 trends by recording transactions that involve the non-transactable payment account identifier. In some embodiments, the non-transactable payment account identifier may comprise 16, 18, or 19 digits and can be formatted as a PAN so that merchants 130 can easily integrate a non-transactable payment account identifier into an existing consumer-tracking system that typically uses a PAN for consumer tracking. The non-transactable payment account identifier may replace a PAN for any suitable identification purpose. A consumer 120 may have more than one payment account, and thus the consumer 120 may be associated with multiple non-transactable payment account identifiers. A non-transactable payment account identifier may also be formatted to indicate an issuer 150 and/or a token vault 110.

In some embodiments, the merchant 130 may use the non-transactable payment account identifier and associated consumer purchase record for other applications including value added services such as loyalty programs, backend applications, and reporting. For example, the non-transactable payment account identifier may function as a consumer 120 loyalty identifier for tracking loyalty points and providing rewards or special offers.

The merchant 130 (or other entity) may also use the non-transactable payment account identifier for fraud/risk checks during authorization. For example, the merchant 130 may be able to detect high-velocity transactions. If too many transactions (associated with the same payment token or multiple payment tokens corresponding to an underlying real account identifier) associated with the non-transactable payment account identifier occur within a certain amount of time, the merchant 130 may suspect fraudulent activity. The merchant may then reject further transactions involving the non-transactable payment account identifier. Alternatively, the merchant 130 may mark the non-transactable payment account identifier as high-risk or put the non-transactable payment account identifier on a "blacklist." The merchant 130 may also use the non-transactable payment account identifier to review fraud/risk levels after a transaction is authorized.

The merchant 130 may use the non-transactable payment account identifier to access past transactions. For example, the merchant 130 may use the non-transactable payment account identifier to identify a past transaction for a refund or an inquiry.

The non-transactable payment account identifier may also be used for providing a transaction feed to third party value added applications. For example, the merchant 130 may inform third party applications about consumer 120 purchases and trends that are tracked via the non-transactable payment account identifier. A third-party may use a transaction feed for providing rewards or offers to the consumer in real time or offline (e.g. in a statement of credit).

The acquirer 135 may be associated with the merchant 130, and may manage authorization requests on behalf of the merchant 130. The acquirer 135 may receive an authorization request message including the token and non-transactable payment account identifier from the merchant 130 and send the authorization request message to a payment processing network 140. The payment processing network 140 may be associated with the token and may be identified by one or more fields within the token.

The acquirer 135 may use the non-transactable payment account identifier for online fraud analysis, offline fraud analysis, loyalty services, third party loyalty programs, reporting to merchants, or any other suitable purpose. For example, in some embodiments, the acquirer 135 may flag a payment account (identified by a non-transactable payment account identifier) and an associated merchant 130 for fraud/risk level scoring. In another example, a non-transactable payment account identifier may be used for providing card-linked offers. In another example, the acquirer 135 may provide a consumer transaction report to merchants, the report including transactions that involved a certain non-transactable payment account identifier.

In some embodiments, the merchant 130 and/or the acquirer 135 may be able to provide a non-transactable payment account identifier to the token vault 110 and then receive associated payment account information. Additionally, in some embodiments, the merchant 130 and/or the acquirer 135 may provide payment account information to the token vault 110, and then receive an associated non-transactable payment account identifier. For example, a merchant 130 may send a "Get PAN" request that includes the non-transactable payment account identifier to the token vault 110, and the token vault 110 may respond with the PAN information. Alternatively, the merchant 130 may send a "Get non-transactable payment account identifier" request including the PAN and/or the transactable payment token to the token vault 110, and receive a non-transactable payment account identifier associated with the PAN.

The acquirer 135, the payment processing network 140, and the issuer 150, may operate suitable routing tables to route authorization request messages using real account identifiers such as PANs or tokens. Token routing data may be provided or maintained by the token vault 110, and may be communicated to any of the entities in FIG. 1.

The payment processing network 140 may be disposed between the acquirer 135 and the issuer 150. The payment processing network 140 may include data processing subsystems, networks, and operations used to support and deliver authorization services, exception file services, and clearing and settlement services. For example, the payment processing network 140 may comprise a server computer, coupled to a network interface (e.g. by an external communication interface), and a database(s) of information. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network 140 may use any suitable wired or wireless network, including the Internet.

The payment processing network 140 may be able to de-tokenize any tokens in any authorization request message that is received. For example, the payment processing network 140 may receive an authorization request message including a token and non-transactable payment account identifier, send the token and non-transactable payment account identifier to the token vault 110, receive associated payment account information from the token vault 110, and forward the authorization request message to the issuer 150 with the payment account information. The payment processing network 140 may also receive an authorization response message with the payment account information, and replace some or all of the payment account information with the token and/or non-transactable payment account identifier before forwarding the message to the acquirer 135.

In some embodiments, the token vault 110 and the payment processing network 140 may form a token service system. The token service system comprises a token service computer comprising a first processor and a first computer readable medium, the first computer readable medium comprising code, executable by the first processor to implement a method. The method includes receiving a token request associated with account information, determining a non-transactable payment account identifier and a transactable payment token associated with the account information, and providing the non-transactable payment account identifier and the transactable payment token associated with the account information. The method also includes a payment processing network computer in communication with the token service computer. The payment processing network computer comprises a second processor and a second computer readable medium, the second computer readable medium comprising code, executable by the second processor for implementing a method. The method comprises receiving an authorization request message including the transactable payment token and the non-transactable payment account identifier from a merchant, adding the account information to the authorization request message, sending the authorization request message to an issuer, receiving an authorization response message including the account information from the issuer, replacing the account information with the transactable payment token and the non-transactable payment account identifier in the authorization response message, and sending the authorization response message to the merchant.

The token network 145 may also be able to provide de-tokenization services. The token network 145 may include another payment processing network, another token vault, and/or another token requestor. For example, in some embodiments, the consumer 120 may receive a token that is associated with a payment processing network of the token network 145. In order to de-tokenize the token for authorization, the payment processing network 140 may send the token and non-transactable payment account identifier to the token network 145, which may then return the payment account information. In some embodiments, the token network 145 may wish to de-tokenize a token that is associated with the payment processing network 140, and may obtain associated payment account information by similarly communicating with the payment processing network 140 and token vault 110.

Figure 2:
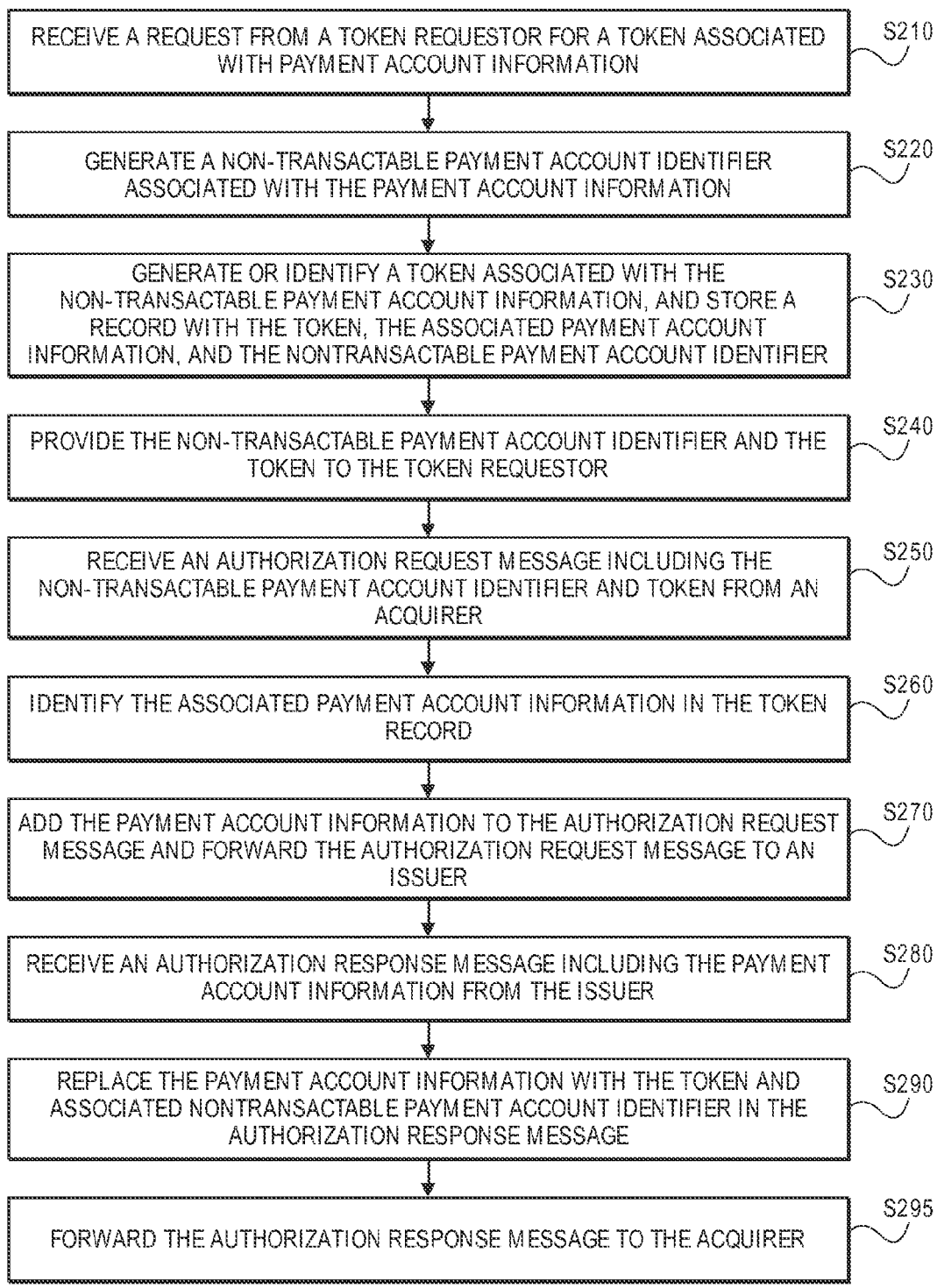
FIG. 2 shows a flowchart illustrating a method according to an embodiment of the invention.

A method 200 according to embodiments of the invention can be described with respect to FIG. 2. The steps shown in the method 200 may be performed sequentially or in any suitable order in embodiments of the invention.

In a purchase transaction, the consumer 120 may purchase a good or service at a merchant 130. The merchant 130 may then request that the consumer 120 provide payment information to conduct the purchase. Instead of providing a credit card number to the merchant 130, the consumer 120 can use a token to conduct the payment transaction. The consumer 120 may cause the token requestor 115 to request a token to conduct the transaction. In this example, the token requestor 115 may be the consumer's mobile phone or may be a digital wallet that is associated with the consumer's mobile phone. The token requestor 115 may then send a token request to the token vault 110 on behalf of the consumer 120.

The token may be requested or provided using any suitable form of communication. In some embodiments, a token request may be in an electronic message format, such as an e-mail, a short messaging service (SMS) message, a multimedia messaging service (MMS) message, a hypertext transfer protocol (HTTP) request message, a transmission control protocol (TCP) packet, a web form submission. The token request may be directed to any suitable location, such as an e-mail address, a telephone number, an internet protocol (IP) address, or a uniform resource locator (URL). In some embodiments, a token request may comprise a mix of different message types, such as both email and SMS messages.

Further, the token request may include any suitable type of information. For example, the token request may include an account identifier (e.g., a PAN) associated with an account that is to be used to pay for the good or service, a token requestor ID, or any other suitable information.

In step S210, the token vault 110 may receive the token request from the token requestor 115. As noted above, the token request may include information about the payment account for which a token is desired.

In step S220, in response to the token request, the token vault 110 may determine (e.g., generate or identify) a non-transactable payment account identifier and associate the non-transactable payment account identifier with the payment account information of the consumer 120. The token vault 110 may store a record of the non-transactable payment account identifier and associated payment account information in a database if desired.

The non-transactable payment account identifier may be determined in any suitable manner. For example, the non-transactable payment account identifier may be generated using an algorithm that converts a real PAN into the non-transactable payment account identifier. In some embodiments, the algorithm may be an encryption algorithm such as DES, triple DES, etc. In another example, a listing of non-transactable payment account identifiers may be generated in advance and a non-transactable payment account identifier could be assigned to each received token request.

In step S230, the token vault 110 may then determine (e.g., identify or generate) a token that represents or is associated with the indicated payment account information. The token vault 110 may maintain a record including the account information, the token associated with the account information, the non-transactable payment account identifier associated with the account information, a token expiration date, a token assurance level, and/or any other suitable information in a database.

The token may be determined in any suitable manner. For example, the non-transactable payment account identifier may be generated using an algorithm that converts a real PAN into the token. In another example, a listing of tokens may be generated in advance and a token could be assigned to each received token request.

In step S240, the token vault 110 may then transmit the token and the non-transactable payment account identifier to the token requestor 115 in a token response message. In other embodiments, the token and the non-transactable token may be transmitted to the token requestor 115 in multiple messages. The token response message may have the same or different form or format as the previously described token request message. It may also have additional information that was not present in the token request message. For example, the token response message may include other information such as the time period in which the token would be valid.

The token requestor 115 may provide the information to the consumer 120 (i.e., a payment device operated by the consumer 120), which may then provide the token and non-transactable payment account identifier to the merchant 130. Or, the token requestor 115 may provide the information to the merchant 130. Any suitable mode of communication may be used to provide the information to the merchant 130.

As will be described in further detail below, in some embodiments, the token is provided as payment information and the non-transactable payment account identifier is provided as extended token data or additional VAS data. In some embodiments, the token requestor 115 or consumer 120 may generate a QR code that may include the token and the non-transactable payment account identifier in a transaction payload. The consumer 120 may provide the QR code to the merchant 130 via an access device. Any other suitable communication mechanism (e.g., a contactless mechanism) may be used to pass the token and the non-transactable payment account identifier (as well as any other transaction information) to the merchant.

In some embodiments, the merchant 130 may then use the non-transactable payment account identifier to identify a purchase record of the consumer 120 and may update the record with the current transaction. The merchant 130 may use the non-transactable payment account identifier-identified consumer 120 record for various applications including online fraud analysis, offline fraud analysis, value added services (e.g. loyalty, backend applications, reporting), third-party transaction feeds, or any other suitable purposes.

The merchant 130 may forward the token, the non-transactable payment account identifier, and other information to the acquirer 135 in an authorization request message. The token may be in the data field in the authorization request message normally reserved for the PAN, while the non-transactable payment account identifier may be placed in a supplemental or discretionary data field such as Field 55. If desired, the data in the supplemental discretionary data field may follow a tag-length-value data format.

The acquirer 135, in turn, may send the authorization request message to the payment processing network 140. The acquirer 135 may also use the non-transactable payment account identifier for identifying the consumer 120, online fraud analysis, offline fraud analysis, loyalty services, third party loyalty programs, value added services (e.g. loyalty, backend applications), third-party transaction feeds, reporting to merchants, or any other suitable purposes.

In step S250, the payment processing network 140 may receive the authorization request message. After the payment processing network 140 receives the authorization request message, it extracts the token from the authorization request message and then de-tokenizes it. In some embodiments, it can do this by requesting the payment account information from the token vault 110. In some embodiments, if the token is associated with another payment processing network that is a part of a different token network 145, the payment processing network 140 may request the payment account information from the token network 145.

The token vault 110 may receive the token and/or non-transactable payment account identifier from the payment processing network 140. In step S260, the token vault 110 may identify the associated payment account information in the token record, and send the payment account information to the payment processing network 140.

In step S270, the payment processing network 140 may replace the token in the authorization request message with the payment account information. For example, if the account information includes a PAN, then the token is removed from the PAN data field in the authorization request message. The PAN is then added back into the authorization request message. The non-transactable payment account identifier may remain in a supplemental data field. Once this is done, the payment processing network 140 may forward the authorization request message to the issuer 150.

After the issuer 150 receives the authorization request message, the issuer 150 may analyze it and may determine whether or not to authorize the transaction. The issuer 150 may determine if the account associated with the authorization request message has sufficient funds or credit. It may also determine that the transaction is not inherently risky. If the transaction is authorized by the issuer 150, the issuer 150 may send an authorization response including the payment account information and an approval code to the payment processing network 140.

In step S280, the payment processing network 140 receives the authorization response message including the payment account information from the issuer 150. The payment processing network 140 may then query the token vault 110 for information associated with the payment account information, such as the token and non-transactable payment account identifier. The token vault 110 may identify the requested information in the token record and provide it to the payment processing network 140.

In step S290, the payment processing network 140 may add the token, non-transactable payment account identifier, or any other suitable transaction information into the authorization response message, and may remove some or all of the payment account information from the message. For example, in some embodiments, the last four digits of a PAN may remain in the message, even though the real PAN is removed and is replaced with the token. The non-transactable payment account identifier may remain in a supplemental data field.

In step S295, the payment processing network 140 may then forward the message to the acquirer 135. The acquirer 135 may forward the message to the merchant 130, which may inform the consumer 120 of the authorization results. The merchant 130 may update the non-transactable payment account identifier-identified consumer 120 transaction record with the authorization results.

At the end of the day or at some other predetermined interval of time, a clearing and settlement process between the issuer 150, the payment processing network 140, and the acquirer 135 may occur. In the clearing and settlement process, account information and token exchanges that are similar to those in the above-described authorization processing steps can occur.

Subsequent transactions using different transactable payment tokens using the same payment device may use the same non-transactable payment account identifier.

As shown above, because the non-transactable payment account identifier passes through a number of entities in the payments system, each of those entities may retrieve, store, analyze, and process the transaction data associated with the non-transactable payment account identifier. This is the case, even though different payment tokens are used for different transactions conducted with the same underlying account or payment device.

Figure 3:
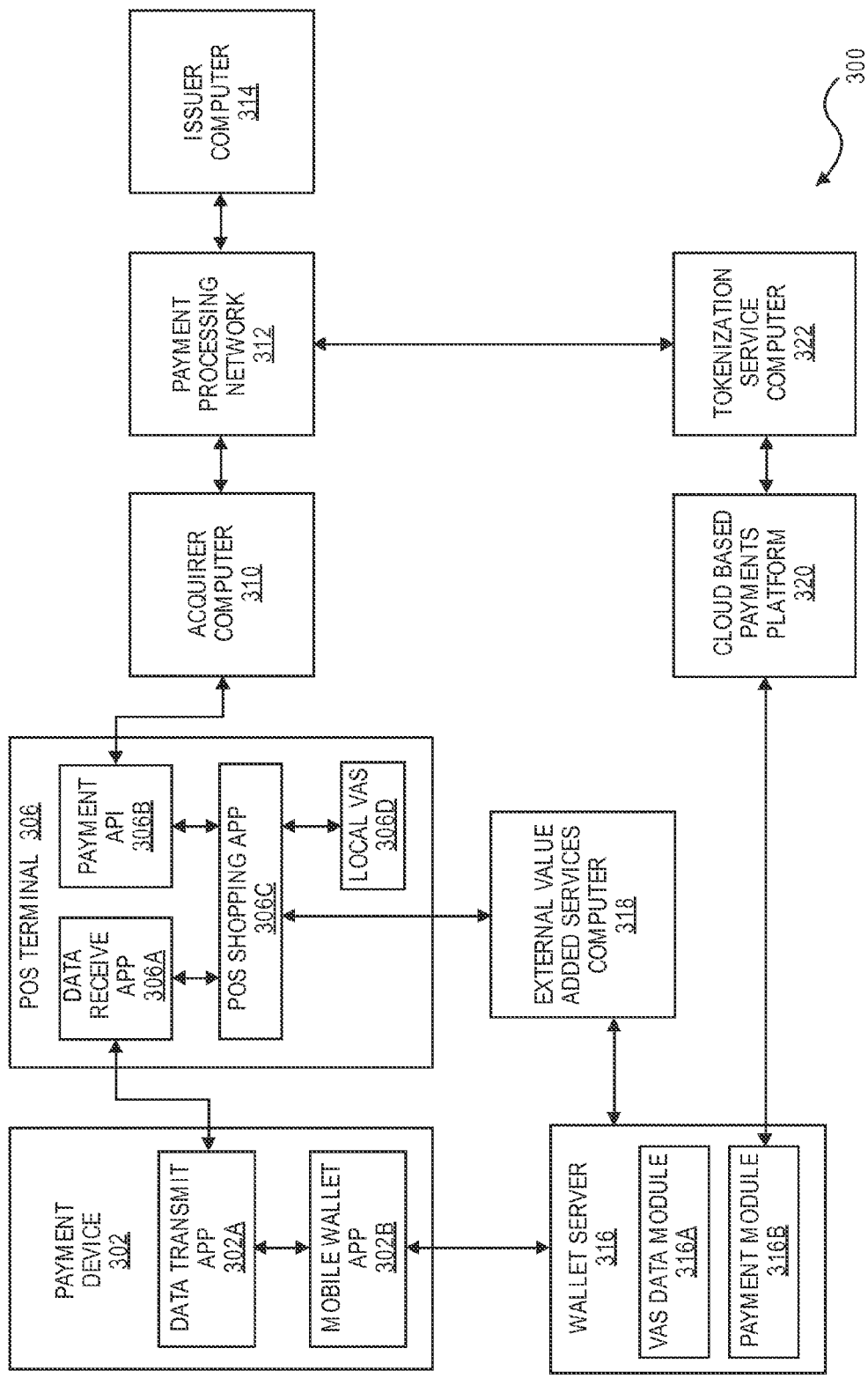
FIG. 3 shows a block diagram of another system according to an embodiment of the invention.

FIG. 3 shows a block diagram of another embodiment of the invention. FIG. 3 shows a diagram of a more detailed system that can incorporate a non-transactable payment account identifier.

FIG. 3 shows a payment device 302 and a POS terminal 306 (which is an example of an access device) which may be located at a merchant. The POS terminal 306 may communicate with an acquirer computer 310, a payment processing network 312, and an issuer computer 314.

The payment device 302 may be in communication with a wallet server computer 316, which may comprise a value added services module (which may include VAS data) 316A and a payment module 316B. The wallet server computer 316 may communicate with an external value added services computer 318 as well as a cloud based payments platform 320 and a tokenization service computer 322. The tokenization service computer 322 may communicate with the payment processing network 312.

The payment device 302 may comprise a data transmit application 302A and a mobile wallet application 302B. For clarity of illustration, some of the hardware and software elements in the payment device 302 are not shown in FIG. 3. The payment device 302 may additionally include a data processor, and a communication interface (e.g., a contactless interface), a memory, a computer readable medium, input devices (e.g., input keys, a microphone, etc.), output devices (e.g., a touchscreen, speaker, etc.), and an antenna (e.g., for long range communication). The payment device 302 may be in the form of a payment card, a key fob, a mobile phone, a tablet computer, a wearable device, etc.

The POS terminal 306 may comprise a data receive application 306A, a payment API (application program interface) 306B, a POS shopping application 306C, and a local value added services (VAS) application 306D. For clarity of illustration, some of the hardware and software elements in the POS terminal 306 are not shown in FIG. 3. The POS terminal 306 may additionally include a data processor, and a communication interface (e.g., a contactless interface, a data reader such as a card reader), a memory, a computer readable medium, input devices (e.g., input keys, a microphone, etc.), output devices (e.g., a touchscreen, speaker, etc.), and an antenna (e.g., for long range communication).

The wallet server 316 may comprise a data processor, a memory and a computer readable medium. The VAS module 316A and the payment module 316B may reside in the memory and/or the computer readable medium. The wallet server 316 may store payment account data (e.g., transactable payment tokens) that may be used by the payment device 302 to conduct purchase transactions.

The external value added services computer 318 may be operated by an entity that is different than the other entities shown in FIG. 3. It may provide value added data (described above and below) to the wallet server 316 and the payment device 302.

The cloud based payments platform 320 may include a gateway that supplies transactable payment tokens, non-transactable payment account identifiers and other information directly or indirectly to the payment device 302.

The tokenization service computer 322 can perform tokenization services and can include the above described token vault.

Figure 4:
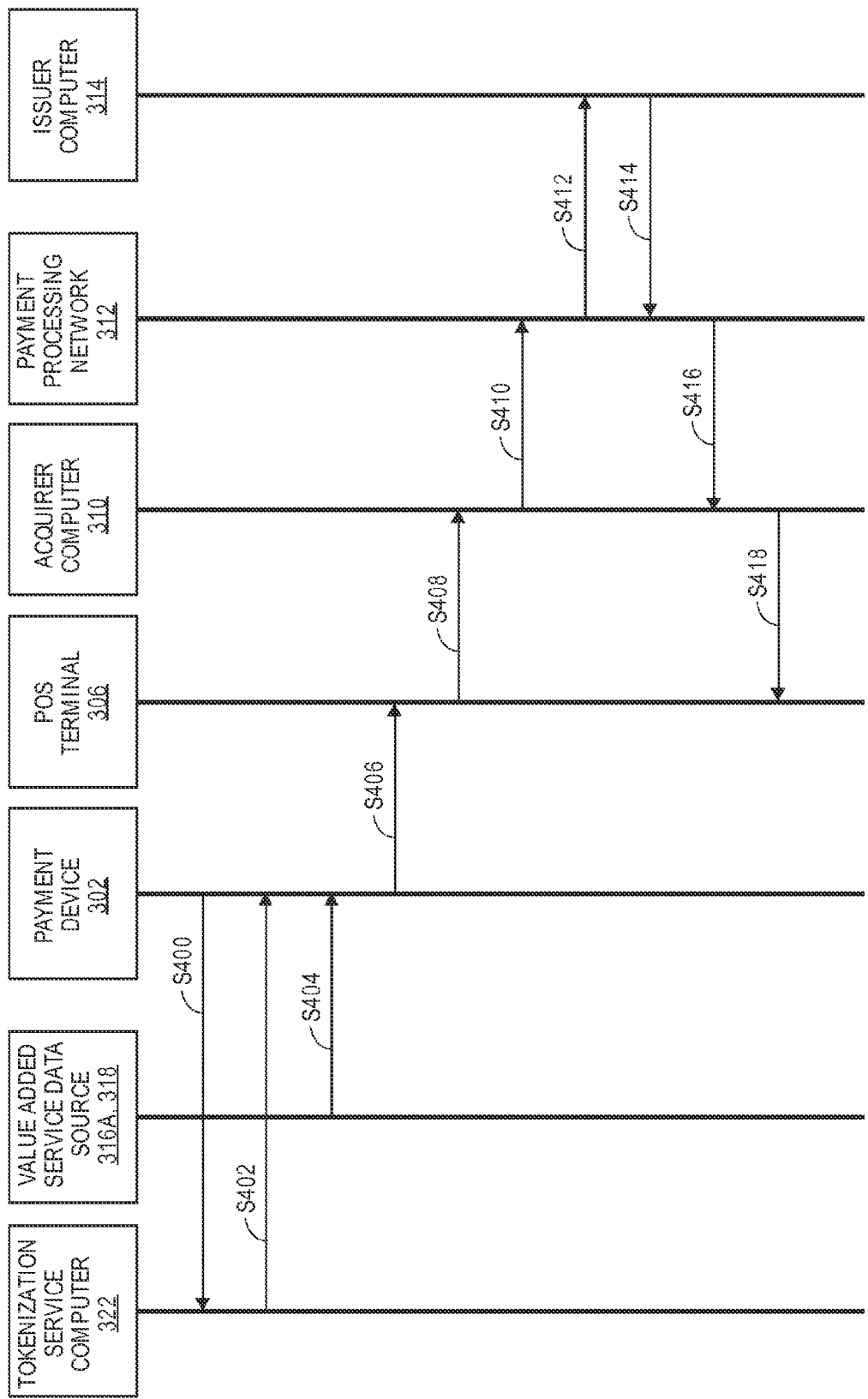
FIG. 4 shows a flow diagram illustrating methods that can be used with the system illustrated in FIG. 3.

FIG. 4 shows a flow diagram illustrating methods that can be used with the system illustrated in FIG. 3. In particular, methods illustrating the use of the non-transactable account identifier with value added services data can be described with reference to FIGS. 3 and 4.

In embodiments of the invention, non-payment data can be provided by merchant or third party applications, which may be used primarily by a merchant POS terminal (and optionally by an acquirer) to provide value added services to consumers. Merchants prefer to have non-payment information (e.g., loyalty IDs, coupon IDs, order numbers, etc.) with payment credentials to provide value added services. Merchants currently get this information in different forms (e.g., manually, cards, multiple apps, etc.) through multiple consumer interactions. This mode of providing such non-payment information is inconvenient for consumers. As illustrated below, embodiments of the invention can combine non-payment data from one or more data sources with payment data in a single data element, which may be transmitted from a payment device to a POS terminal.

Referring to FIG. 4, in step S400, a wallet application 302B in a payment device 302 (e.g., a mobile phone) may send a token request to a tokenization service computer 322. The token request may include an account identifier such as a PAN or some other identifier related to the account. Further details on token requests are provided above.

In step S402, after the token request is received by the tokenization service computer 322, the tokenization service computer 322 performs any desired fraud or status checks on the token request. If the checks indicate that a token can be issued, the tokenization service computer 322 can transmit a token to the wallet application 302B in the payment device 302. In addition to the token, the tokenization service computer 322 may transmit other information including one or more of a token expiration date, a token requestor ID, a digital wallet ID, and a non-transactable payment account identifier to the wallet application 302B on the payment device 302. The token and the other information may be transmitted to the wallet application 302B in the payment device 302 in a single communication or in multiple communications.

In step S404, before or after step S402, one or more value added service data sources 316A, 318 may directly or indirectly transmit value added service data to the wallet application 302B on the payment device 302. The data sources may include value added services data 316A from the wallet server 316 or value added data from the external value added services computer 318. Examples of value added services data may include one or more of a loyalty identifier (e.g., a frequent flier account number) held by the consumer, a coupon identifier, and an order number for a past or current purchase.

The wallet application 302B passes the data from the token service computer 322 and the value added service data source(s) 316, 318 to the data transmit application 302A in the payment device 302A. The data transmit application 302A operating in conjunction with a data processor on the payment device 302A generates a transaction payload and it may be in the form of a data element such as a QR code. Other data elements such as a cryptogram may be generated by the payment device 302A and may be included in the transaction payload. By incorporating value added services data from the wallet application 302B in the payment device 302 with the token, value added services that can benefit the consumer or others can be easily provided at the point of transaction.

The value added services data may be in any suitable form, and may include any suitable type of data. It may include strings of characters, image files, videos, etc. Each piece of value added data may have a tag value associated with it. The tag may be defined by the entity (e.g., a payment processing network) that originates or processes the value added services data. Table 1 below provides examples of value added services data.

TABLE 1

Exemplary value added services data list

| Value added services data | Description | Data Type |
| --- | --- | --- |
| Merchant loyalty ID | Loyalty ID issued by a merchant and processed at a POS terminal | Alphanumeric |
| Alternate loyalty credential - e-mail | Loyalty ID in the form of a consumer e-mail address | E-mail address |
| Alternate loyalty credential - phone | Loyalty ID in the form of a phone number | Numeric |
| Order confirmation | Order number placed by consumer at merchant - for remote order and pickup | Alphanumeric |
| Offer code | Coupon/Offer code locally redeemable by the merchant POS terminal | Numeric |
| Employee ID | Employee ID at retailer which makes them eligible for special discounts | Alphanumeric |
| Zip code | Zip code which may be used for data analysis | Numeric |
| Ticket number | Ticket number which may be processed by a POS terminal | Alpha Numeric |

TABLE 1-continued

Exemplary value added services data list

| Value added services data | Description | Data Type |
|---|---|---|
| Token Requestor (Wallet) URL | URL of Token Requestor (Wallet) Service for merchant POS to close the loop | URL |

After the wallet application 302B receives the value added services data, the token, the non-transactable account identifier, and any other suitable information in the token response from the tokenization service computer 322, the data transmit application 302A may obtain and consolidate this information into a single data element. The single data element can be transmitted to the POS terminal 306 at the merchant. For instance, the data transmit application 302A may be a QR code generation module, which may generate a single QR code which encodes the token, the non-transactable account identifier, and any value added services data. Other information that may be included in the single data element may include cryptograms or other information that may be generated by the payment device 302. In other embodiments, multiple data elements can be generated to encode the token and its associated data, as well as the value added services data.

After the single data element is generated by the payment device 302, in step S406, it is then passed to data receive application 306A in the POS terminal 306. The data receive application 306A, working in conjunction with a data processor in the POS terminal 306, may then convert the single data element into the original data that was used to form the single data element. The POS shopping application 306C in the POS terminal 306 can then optionally retrieve any additional value added service data (e.g., coupons) from a local value added service data store 306D or from the external value added services computer 318, and can perform any desired processing. For example, in some embodiments, the value added services data could be a coupon that is redeemable at the merchant that operates the POS terminal 306. The POS shopping application 306C may reduce the amount of the transaction by the value of the coupon when generating an authorization request message for the amount that will be owed by the consumer when conducting the transaction.

After the POS shopping application determines the amount of the payment transaction, the POS terminal 306 then generates an authorization request message comprising at least some of the elements in the transaction payload received from the payment device 302. The token may be in the data field in the authorization request message normally reserved for the PAN, while the non-transactable payment account identifier may be placed in a supplemental or discretionary data field such as Field 55. If desired, the data in the supplemental discretionary data field may follow a tag-length-value data format.

In step S408, the authorization request message is transmitted by the POS terminal 306 via the payment API 306B to the acquirer computer 310. The authorization request message may comprise any suitable data including the token and the non-transactable payment account identifier. It may also include the token expiration date, the cryptogram from the payment device 302, the token requestor identifier, the digital wallet identifier, and a POS terminal entry mode.

The POS terminal entry mode may identify the mode in which the POS terminal 306 received the transaction payload from the payment device 302. For example, the POS terminal entry mode may indicate that a QR code was the mechanism that was used to transmit the transaction payload from the payment device 302 to the POS terminal 306. This information can be useful to a downstream payment processor. For example, some modes of data transmission are inherently more secure or reliable than other modes of data transmission. This information can be used, for example, to improve transaction fraud scoring.

In step S410, after receiving the authorization request message from the POS terminal 306, the authorization request message is then transmitted from the acquirer computer 310 to the payment processing network 312.

After the payment processing network 312 receives the authorization request message, it may then alter the authorization request message. For example, a computer in the payment processing network 312 may provide the token, the token expiration date, and any other appropriate information to the tokenization service computer 322. If the token is valid, the tokenization service computer 322 may then provide the real account identifier to the payment processing network 312. The payment processing network can then replace the token and the token expiration date in the authorization request message with the real account identifier (e.g., a PAN) and the expiration date for the real account identifier.

In step S412, the modified authorization request message is then transmitted by the payment processing network 312 to the issuer computer 314.

The issuer computer 314 then determines whether or not the transaction should be authorized. It may conduct any appropriate fraud or credit checks to determine whether or not to approve of the transaction. After this analysis occurs, in step S414, the issuer computer 314 then generates and sends an authorization response message comprising the real account identifier back to the payment processing network computer 312.

The payment processing network 312 may then substitute the token for the real account identifier in the authorization response message. The payment processing network 312 may also provide other information in the authorization response message including, but not limited to a PAN product ID (e.g., an ID that indicates that the PAN is associated with a credit card with a higher customer status), the last four digits of the real account identifier, the token assurance level, the non-transactable payment account identifier, and the token requestor identifier.

In step S416, after the payment processing network 312 modifies the authorization response message, the payment processing network 312 may transmit the modified authorization response message to the acquirer computer 310.

In step S418, after the acquirer computer 310 receives the authorization response message, the acquirer computer 310 may transmit the authorization response message to the POS terminal 306.

At the end of the day or at some other predetermined interval of time, a clearing and settlement process between the issuer computer 314, the payment processing network 312, and the acquirer computer 310 may occur. In the clearing and settlement process, account information and token exchanges that are similar to those in the above-described authorization processing steps can occur.

Subsequent transactions using different transactable payment tokens using the same payment device may use the same non-transactable payment account identifier.

As shown above, because the non-transactable payment account identifier passes through a number of entities in the payments system, each of those entities may retrieve, store, analyze, and process the transaction data associated with the non-transactable payment account identifier. This is the case, even though different payment tokens are used for different transactions conducted with the same underlying account or payment device.

Embodiments of the invention have a number of advantages. For example, the non-transactable payment account identifier allows merchants to track consumer spending habits, analyze fraud/risk, provide transaction feeds to third party applications, etc. without requiring sensitive payment account information, such as a PAN. Thus, tokens may be used to make a consumer's payment account information more secure without interfering with a merchant's programs. Instead of tracking a payment account by several digital wallet-specific tokens, potentially leading to multiple detached records for one consumer, the merchant (or other entity) may be able to aggregate all token spending records for one payment account via the non-transactable payment account identifier.

Figure 5:
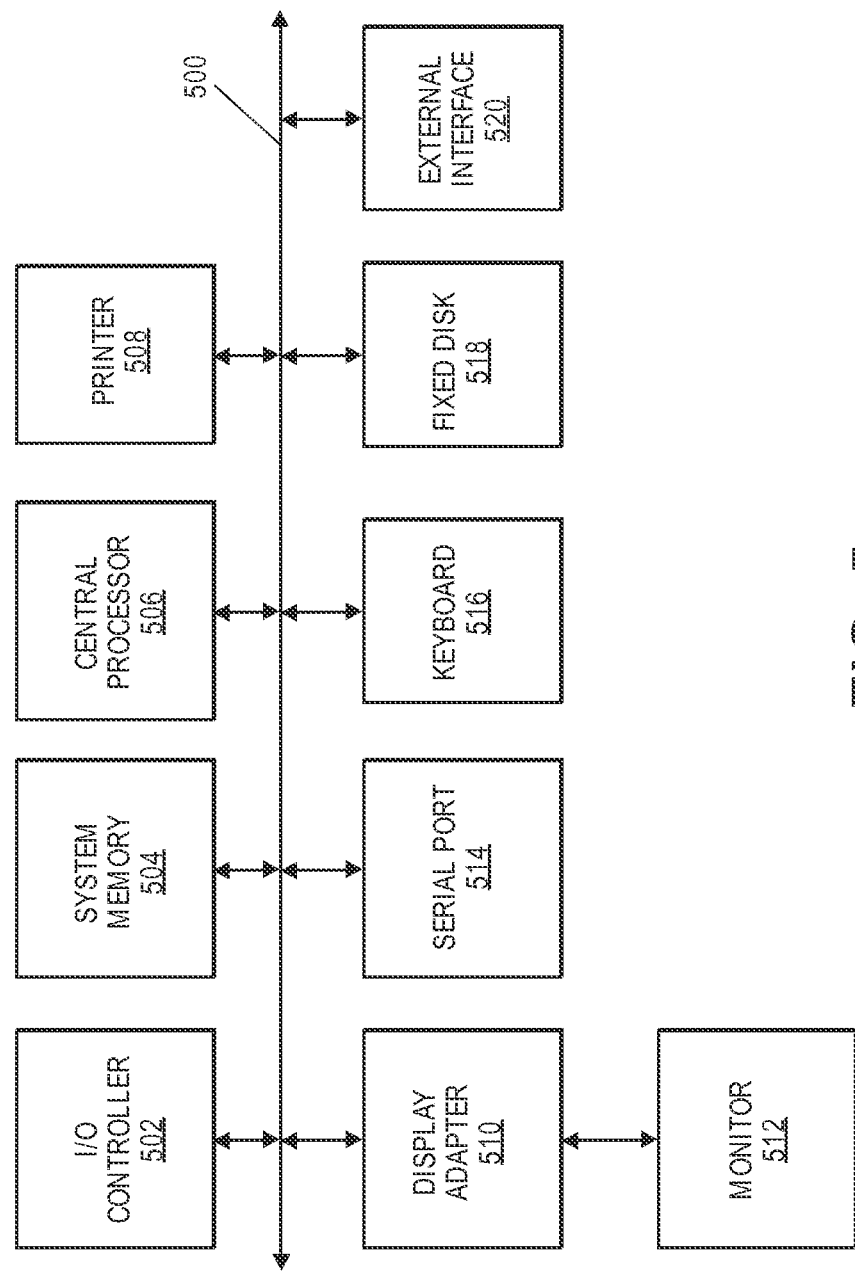
FIG. 5 shows a block diagram of a computer apparatus according to an embodiment of the invention.

FIG. 5 is a high level block diagram of a computer system that may be used to implement any of the entities or components described above. The subsystems shown in FIG. 5 are interconnected via a system bus 500. Additional subsystems include a printer 508, keyboard 516, fixed disk 518, and monitor 512, which is coupled to display adapter 510. Peripherals and input/output (I/O) devices, which couple to I/O controller 502, can be connected to the computer system by any number of means known in the art, such as a serial port. For example, serial port 514 or external interface 520 can be used to connect the computer apparatus to a wide area network such as the Internet, a mouse input device, or a scanner. The interconnection via system bus 300 allows the central processor 506 to communicate with each subsystem and to control the execution of instructions from system memory 504 or the fixed disk 518, as well as the exchange of information between subsystems. The system memory 504 and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
    receiving, by a token service computer, a first request comprising a primary account identifier from a token requestor computer;
    determining, by the token service computer, a transactable payment token and a non-transactable payment account identifier associated with the primary account identifier;
    transmitting, by the token service computer, the transactable payment token and the non-transactable payment account identifier to the token requestor computer,
    wherein the transactable payment token and the non-transactable payment account identifier are subsequently provided to one or more entities to conduct a first payment transaction;
    receiving, by the token service computer, a second request comprising the non-transactable payment account identifier from an entity of the one or more entities;
    determining, by the token service computer, information associated with the non-transactable payment account identifier; and
    transmitting, by the token service computer, the information associated with the non-transactable payment account identifier to the entity.

2. The method of claim 1, wherein the non-transactable payment account identifier is formatted as a primary account number.

3. The method of claim 1, wherein the non-transactable payment account identifier is static over time and over any number of transactions.

4. The method of claim 1 wherein the entity is a merchant, acquirer, issuer, or payment processing network.

5. The method of claim 1 wherein the information associated with the non-transactable payment account identifier comprises the primary account identifier.

6. A token service computer comprising:
    a processor; and
    a computer readable medium, the computer readable medium comprising code, executable by the processor, for implementing a method comprising
    receiving a first request comprising a primary account identifier from a token requestor computer,
    determining a transactable payment token and a non-transactable payment account identifier associated with the primary account identifier,
    transmitting the transactable payment token and the non-transactable payment account identifier to the token requestor computer,
    wherein the transactable payment token and the non-transactable payment account identifier are subsequently provided to one or more entities to conduct a first payment transaction, receiving a second request comprising the non-transactable payment account identifier from an entity of the one or more entities, determining information associated with the non-transactable payment account identifier, and transmitting the information associated with the non-transactable payment account identifier to the entity.

7. The token service computer of claim 6, wherein the non-transactable payment account identifier is static over time and over any number of transactions.

8. A system comprising: the token service computer of claim 6, and a consumer's payment device configured to interact with the entity.

9. The token service computer of claim 6 wherein the entity is a merchant, acquirer, issuer, or payment processing network.

10. The token service computer of claim 6 wherein the information associated with the non-transactable payment account identifier comprises the primary account identifier.

11. A method comprising:

receiving, by a token service system, a first request associated with account information;

determining, by the token service system, a non-transactable payment account identifier and a transactable payment token associated with the account information;

providing, by the token service system, the non-transactable payment account identifier and the transactable payment token;

receiving, by the token service system, an authorization request message to conduct a first payment transaction comprising the transactable payment token and the non-transactable payment account identifier from a merchant;

adding, by the token service system, the account information to the authorization request message;

sending, by the token service system, the authorization request message to an issuer computer;

receiving, by the token service system, an authorization response message comprising the account information from the issuer computer;

replacing, by the token service system, the account information with the transactable payment token and the non-transactable payment account identifier in the authorization response message;

sending, by the token service system, the authorization response message to the merchant;

receiving, by the token service system, a second request comprising the non-transactable payment account identifier from an entity;

determining, by the token service system, information associated with the non-transactable payment account identifier; and transmitting, by the token service system, the information associated with the non-transactable payment account identifier to the entity.

12. The method of claim 11 wherein the token service system comprises a token service computer and a payment processing network computer.

13. The method of claim 11 wherein the account information comprises a PAN (primary account number), and the non-transactable payment account identifier and the transactable payment token have the same format as the PAN.

14. The method of claim 13 wherein the PAN, the non-transactable payment account identifier, and the transactable payment token are each sixteen characters in length.

15. A system comprising:

a token service computer comprising a first processor and a first computer readable medium, the first computer readable medium comprising code, executable by the first processor to implement a method comprising receiving a first request associated with account information, determining a non-transactable payment account identifier and a transactable payment token associated with the account information, and providing the non-transactable payment account identifier and the transactable payment token associated with the account information, wherein the transactable payment token and the non-transactable payment account identifier are subsequently provided to conduct a first payment transaction, receiving a second request comprising the non-transactable payment account identifier, determining information associated with the non-transactable payment account identifier, providing the information associated with the non-transactable payment account identifier; and a payment processing network computer in communication with the token service computer, the payment processing network computer comprising a second processor and a second computer readable medium, the second computer readable medium comprising code, executable by the second processor for implementing a method comprising receiving an authorization request message to conduct the first payment transaction including the transactable payment token and the non-transactable payment account identifier from a merchant, adding the account information to the authorization request message;

sending the authorization request message to an issuer, receiving an authorization response message including the account information from the issuer, replacing the account information with the transactable payment token and the non-transactable payment account identifier in the authorization response message, and sending the authorization response message to the merchant.

16. The system of claim 15 wherein the account information comprises a PAN (primary account number), and the non-transactable payment account identifier and the token have the same format as the PAN.

17. The system of claim 16 wherein the PAN, the non-transactable payment account identifier, and the token are each sixteen characters in length.

18. The system of claim 16 further comprising:

an access device in communication with the payment processing network.

19. The system of claim 18 further comprising:

a payment device configured to interact with the access device.

20. The system of claim 15 wherein the system is a token service system.

* * * * *